G. LEVE.

Sleeping Car.

No. 9,688. Reissued May 3, 1881.

Witnesses:

R. Arthur Mellond

Owen W. Evans

Inventor:

Gustave Leve

Per Atty. Rastly Lequolee

N. PETERS, Photo-Lithographer, Washington, D. C.

UNITED STATES PATENT OFFICE.

GUSTAVE LEVE, OF MONTREAL, QUEBEC, CANADA.

SLEEPING-CAR.

SPECIFICATION forming part of Reissued Letters Patent No. 9,688, dated May 3, 1881.

Original No. 181,857, dated September 5, 1876. Application for reissue filed January 4, 1881.

*To all whom it may concern:*

Be it known that I, GUSTAVE LEVE, of the city of Montreal, in the district of Montreal and Province of Quebec, Canada, have invented certain new and useful Improvements in Sleeping-Cars; and I do hereby declare that the following is a full, clear, and exact description of the same.

To furnish railroad-cars with berths so constructed and arranged that they may be folded up out of the way in preparing the car for day use, and will not interfere with the ordinary use of the car, is the object of my invention, which may thus be briefly described:

Frames divided into two compartments by a central partition are hinged to the side walls of a car in such a way that they may be swung in against the said walls or swung out at right angles with them; and in combination with these hinged frames are arranged berths in such a way that the said berths may be placed in a vertical position within said frames, or turned down into a horizontal position between two adjacent frames. With these I propose to construct the car-floor with recesses at right angles with the side walls, to receive the lower ends of the hinged frames when said frames are swung outward.

Figure 1:
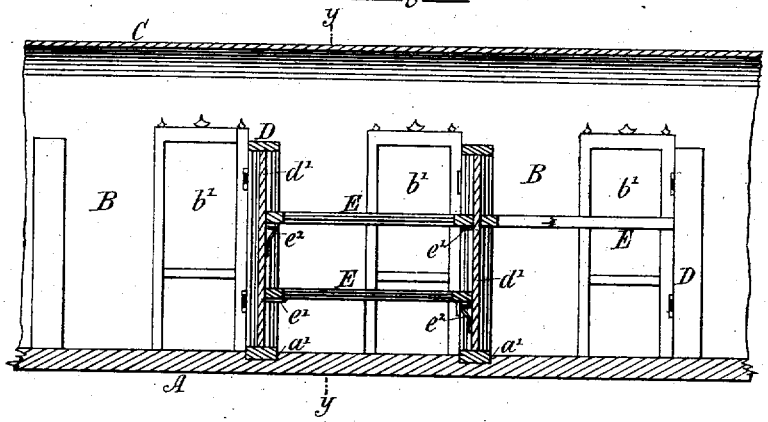
Figure 2:
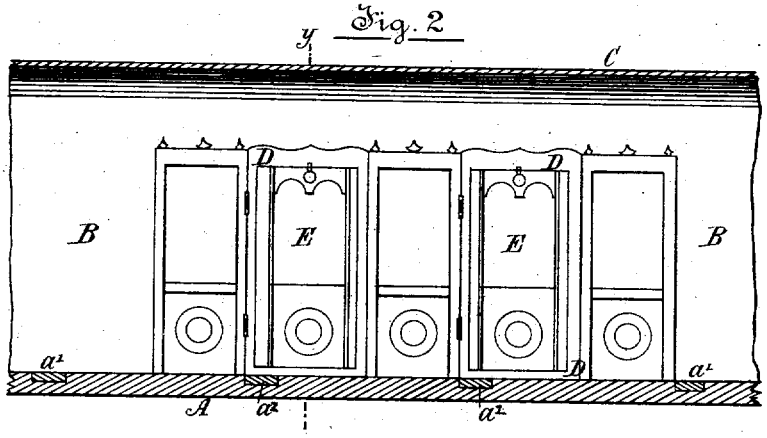
Figure 3:
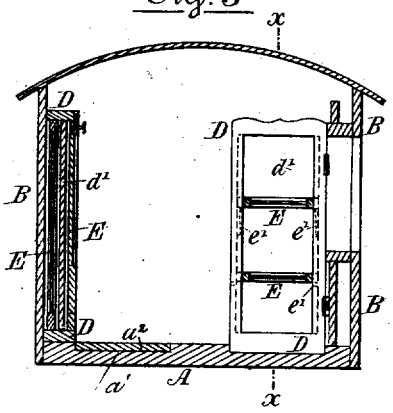

For full comprehension of the invention reference must be had to the annexed drawings, in which Figure 1 is a detail longitudinal section of part of a car embodying my invention, taken through line *x x*, Fig. 3, showing some of the berths arranged for use. Fig. 2 is the same view as Fig. 1, but showing the berths closed up. Fig. 3 is a cross-section taken through the line *y y*, Figs. 1 and 2.

Similar letters of reference indicate corresponding parts.

A represents the floor, B the side walls, and C the roof, of a car, about the construction of which parts there is nothing new.

$b'$ are the windows, which are formed in the side walls, B, in the usual way, and in the spaces between them are hinged frames D, which during the day are turned in against the sides of the car and form, to all appearances, part thereof, but when it is desired to convert the car into a sleeper are turned out at right angles thereto, and secured in such position by pintles dropped into recesses $a'$ formed in the floor A to receive them, which recesses, when the frames D are turned in against the wall B, are closed by blocks $a^2$ fitting into them.

The frames D are usually divided into two compartments by a central plate, $d'$, and into each of these compartments is fitted a berth, E, with all bedding necessary therefor. To the side edges of one end of each berth E are attached pins which enter longitudinal grooves in the inner surfaces of the side bars of the frames D, so that by moving the upper end of each berth outward it may be slid upward and turned down into a horizontal position, its free end entering the adjacent frame D, and resting upon stop-pins $e'$ attached to said frame.

The pivoted ends of the berths E rest upon spring-stops $e^2$ attached to said frames D, which are so formed as to yield and allow said frame to be slid up or down when adjusting it into either position. In this way two berths are formed between each two frames D, as shown in Figs. 1 and 3.

The bottoms of the berths E that are outward when the frames D are turned in against the walls B are, as before mentioned, made similar to the walls of the car by paneling, as indicated in Fig. 2.

By this construction of sleeping-cars it will be obvious that the following advantages are obtained, viz: The weight of the berths, &c., being wholly carried by the floor of the car, the center of gravity is lower than in the ordinary construction of sleeping-car, in which the upper berths are contained in the roof, and the car therefore less liable to oscillation. The car, directly the berths are put away, is converted into an open drawing-room car. The upper berths are lighted equally as well as the lower ones.

Having thus described my invention, what I claim is as follows:

1. In a sleeping-car, frames placed between the windows, holding the berths and bedding in a vertical position and folding flat against sides of car, so as to leave a clear floor-area between their fronts.

2. In a sleeping-car, frames hinged to side of car, either folded back flat against same or swung out and secured at right angles thereto.

3. In a sleeping-car, frames hinged to side of car, and either folding flat against same or swung out at right angles thereto, in the first position holding the berths and bedding vertically, and in the second carrying the berths made up for the night.

Witnesses: GUSTAVE LEVE.

E. A. CURTISS,

H. E. WHITNEY.